United States Patent
Peleg et al.

(10) Patent No.: US 6,665,003 B1
(45) Date of Patent: Dec. 16, 2003

(54) SYSTEM AND METHOD FOR GENERATING AND DISPLAYING PANORAMIC IMAGES AND MOVIES

(75) Inventors: Shmuel Peleg, Mevaseret Zion (IL);
Moshe Benezra, Jerusalem (IL);
Robert S. Rosenschein, Jerusalem (IL)

(73) Assignee: Issum Research Development Company of the Hebrew University of Jerusalem, Jerusalem (IL)

( * ) Notice: Subject to any disclaimer, the term of this patent is extended or adjusted under 35 U.S.C. 154(b) by 0 days.

(21) Appl. No.: 09/396,248

(22) Filed: Sep. 16, 1999

Related U.S. Application Data

(60) Provisional application No. 60/100,721, filed on Sep. 17, 1998, provisional application No. 60/102,720, filed on Sep. 29, 1998, provisional application No. 60/113,962, filed on Dec. 28, 1998, provisional application No. 60/116,138, filed on Jan. 12, 1999, provisional application No. 60/116,139, filed on Jan. 12, 1999, provisional application No. 60/123,080, filed on Mar. 4, 1999, and provisional application No. 60/129,987, filed on Apr. 18, 1999.

(51) Int. Cl.$^7$ .................................................. H04N 7/00
(52) U.S. Cl. ......................................................... 348/36
(58) Field of Search .............................. 348/42, 47, 51, 348/53, 64, 39; 382/154, 284, 285, 294; 349/15, 62, 74, 194

(56) References Cited

U.S. PATENT DOCUMENTS

| | | | |
|---|---|---|---|
| 5,049,987 A | * | 9/1991 | Hoppenstein ................ 348/48 |
| 5,130,794 A | * | 7/1992 | Ritchey ........................ 348/39 |
| 5,510,831 A | * | 4/1996 | Mayhew ....................... 348/47 |
| 5,649,032 A | | 7/1997 | Burt et al. .................... 382/284 |
| 5,686,975 A | * | 11/1997 | Lipton ........................ 349/15 |
| 5,721,585 A | | 2/1998 | Keast .......................... 348/36 |
| 5,768,447 A | | 6/1998 | Irani ........................... 382/305 |
| 5,850,352 A | * | 12/1998 | Moezzi et al. .............. 364/514 |
| 5,929,951 A | * | 7/1999 | Sasakura et al. ............. 349/62 |
| 5,963,664 A | * | 10/1999 | Kumar et al. ................ 382/154 |
| 6,064,353 A | * | 5/2000 | Hoshi ............................ 345/7 |
| 6,141,036 A | * | 10/2000 | Katayama et al. ........... 348/47 |
| 6,157,747 A | * | 12/2000 | Szeliski et al. ............. 382/284 |
| 6,252,707 B1 | * | 6/2001 | Kleinberger et al. ........ 359/465 |
| 6,275,254 B1 | * | 8/2001 | Beeteson et al. ............ 348/59 |
| 6,278,480 B1 | * | 8/2001 | Kurahashi et al. ........... 348/59 |
| 6,301,447 B1 | | 10/2001 | Jackson ....................... 396/329 |
| 6,331,871 B1 | * | 12/2001 | Taylor ........................ 348/159 |
| 2002/0005921 A1 | * | 1/2002 | Sasakura et al. ............. 349/62 |

\* cited by examiner

*Primary Examiner*—Vu Le
*Assistant Examiner*—Behrooz Senfi
(74) *Attorney, Agent, or Firm*—Fenster & Company

(57) ABSTRACT

Systems are disclosed for generating left and right panoramic mosaic images for use in facilitating panoramic stereoscopic viewing of a scene, and for displaying stereoscopic panoramic images to a viewer. The left and right panoramic image generators generate the left and right panoramic mosaic images from a series of images recorded or otherwise generated corresponding to respective angular or other positions, each image having a respective left and right image portion, and mosaics portions of those images together to form the respective left and right panoramic images. The display system displays a stereoscopic panoramic image to a viewer by displaying left and right panoramic images such that each is viewed by a respective one of the viewer's eyes.

100 Claims, 9 Drawing Sheets

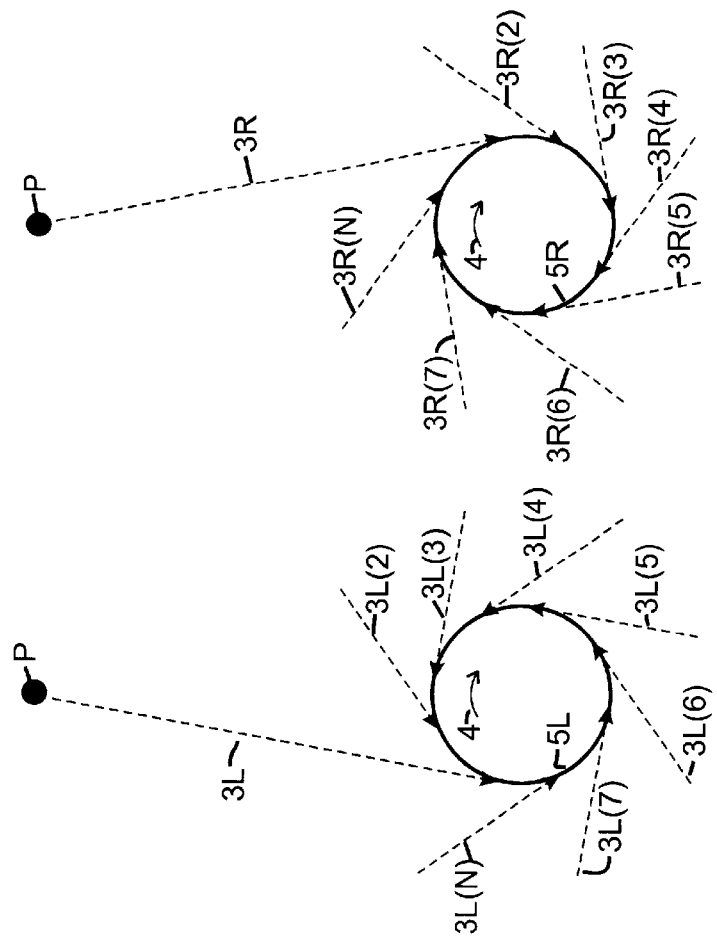
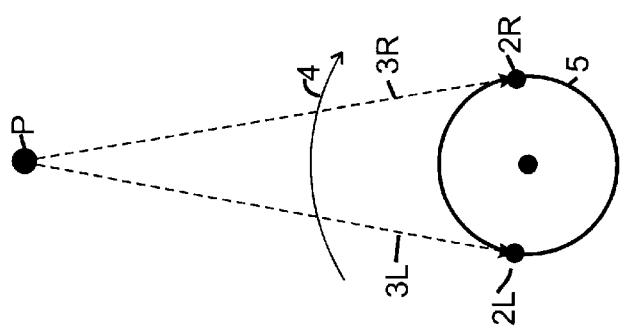
FIG.1B
FIG.1A

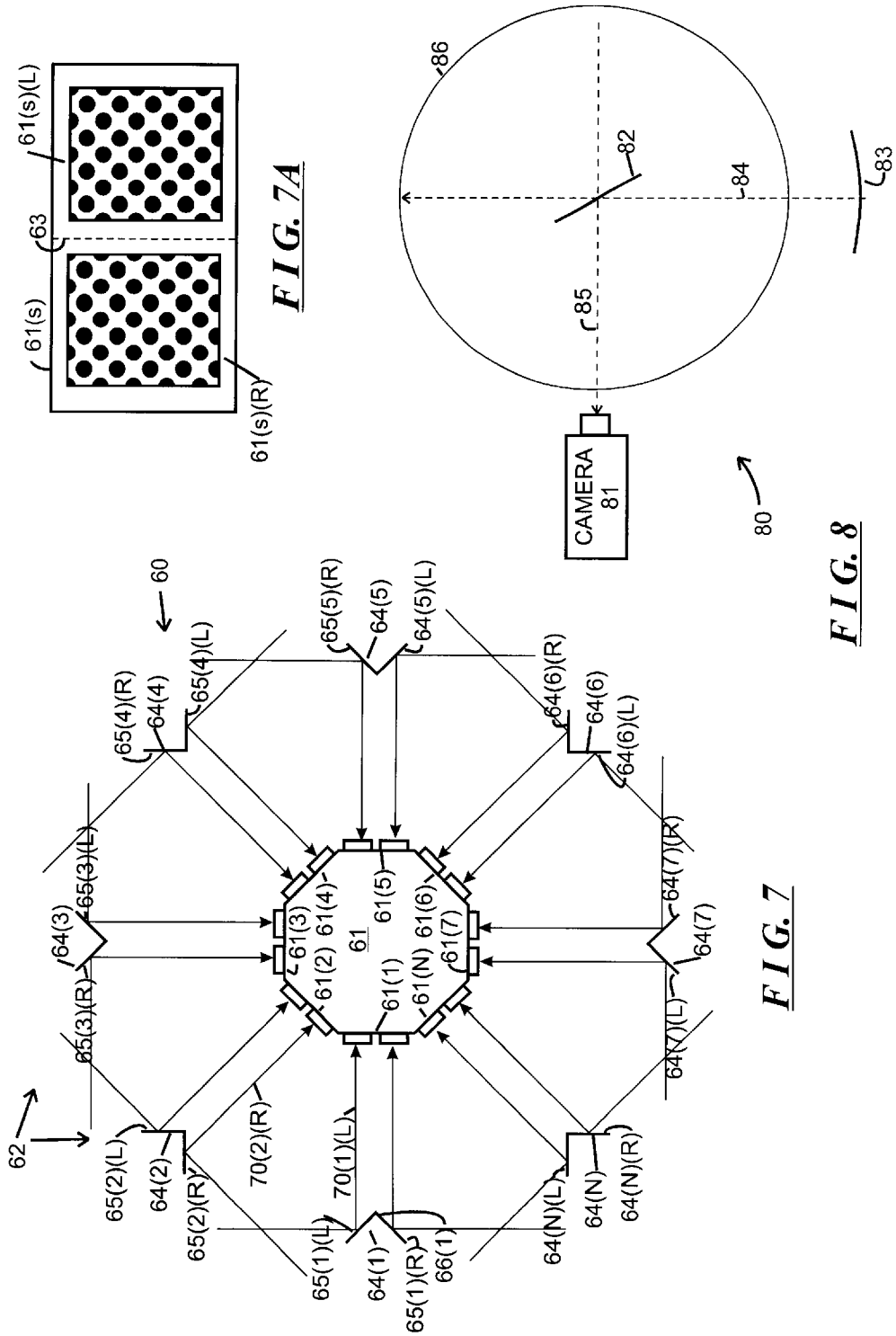

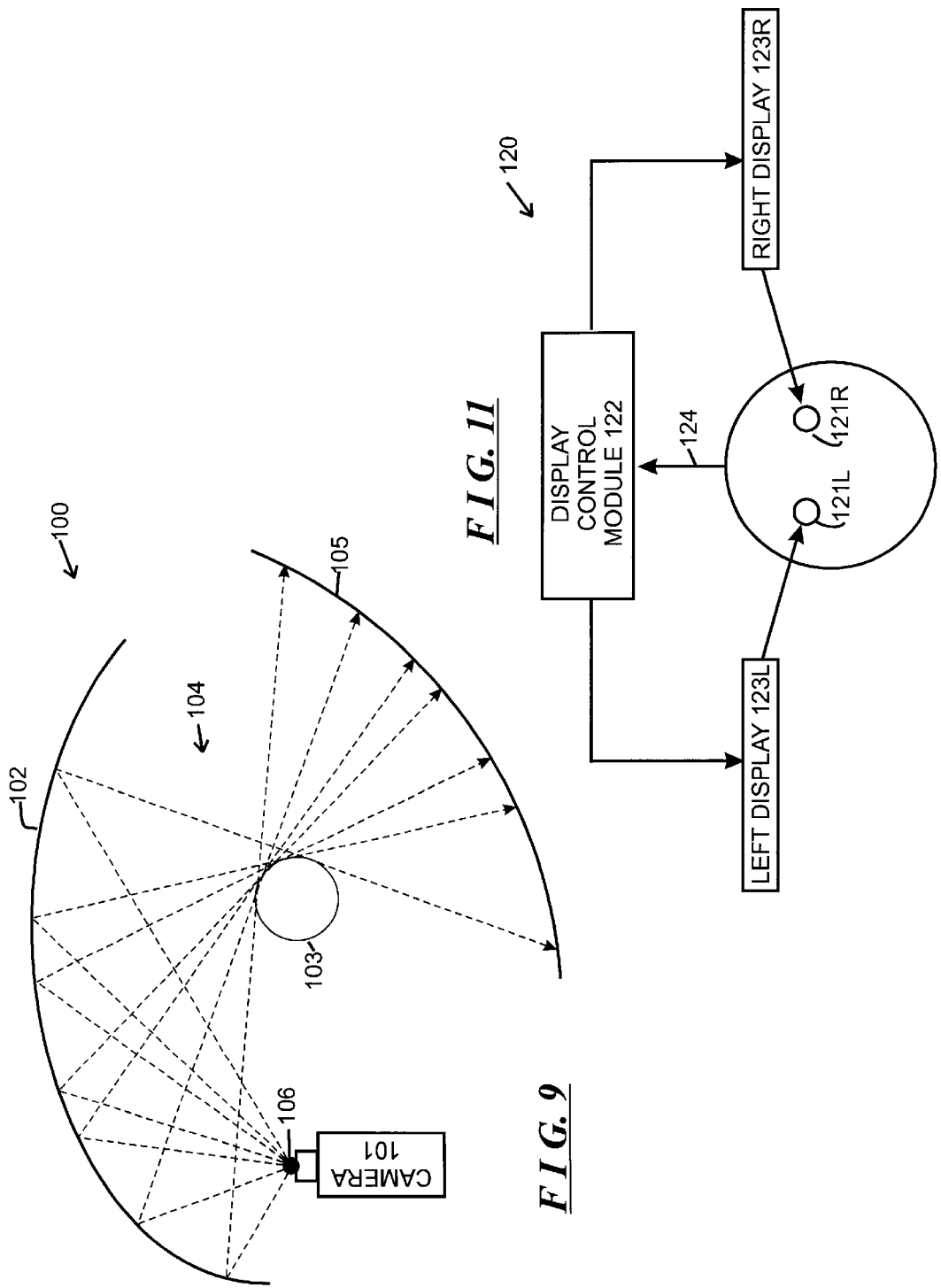

SYSTEM AND METHOD FOR GENERATING AND DISPLAYING PANORAMIC IMAGES AND MOVIES

This application claims the benefit of Provisional application Ser. No. 60/100,721 filed Sep. 17, 1998; Provisional application Ser. No. 60/102,720 filed Sep. 29, 1998; Provisional application Ser. No. 60/113,962 filed Dec. 28, 1998; Provisional application Ser. No. 60/116,138 filed Jan. 12, 1999; Provisional application Ser. No. 60/116,139 filed Jan. 12, 1999; Provisional application Ser. No. 60/123,080 filed Mar. 4, 1999; Provisional application Ser. No. 60/129,987 filed Apr. 18, 1999.

FIELD OF THE INVENTION

The invention relates generally to the field of recording, generating and playing back or displaying images, and more particularly to the generation and displaying of panoramic images stereoscopically.

Panoramic images are images of a scene having a wide field of view, up to a full 360°. Panoramic images may be recorded using a wide angled lens, a mirror, or the like, providing a wide field of view. Panoramic images having a wider field of view can be generated by, for example, recording a plurality of images around a particular point and, using conventional mosaicing techniques, generating a single mosaic image. Panoramic images may also be generated of simulated scenes using conventional computer graphics techniques.

A problem arises in connection with viewing panoramic images stereoscopically. A person can see stereoscopically because his or her eyes are displaced horizontally (when standing) which, will provide a perception of depth when viewing a scene, which would not be present otherwise. Stereoscopic images comprise two images recorded of a scene recorded from slightly displaced positions, which, when viewed simultaneously by the respective eyes, provides a perception of depth. Although currently there are arrangements for generating and displaying stereoscopically non-panoramic images, currently there are no such arrangements for generating and displaying stereoscopically panoramic images.

SUMMARY OF THE INVENTION

The invention provides a new and improved system and method of generating and displaying stereoscopic panoramic images.

In brief summary, in one aspect the invention provides a system for generating left and right panoramic mosaic images for use in facilitating panoramic stereoscopic viewing of a scene. The left and right panoramic image generators generate the left and right panoramic mosaic images from a series of images recorded or otherwise generated corresponding to respective angular or other positions, each image having a respective left and right image portion, and mosaics portions of those images together to form the respective left and right panoramic images.

In another aspect, the invention provides a system for displaying a stereoscopic panoramic image to a viewer, by displaying left and right panoramic images such that each is viewed by a respective one of the viewer's eyes.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 1A and 1B are useful in understanding operations performed by arrangements for generating and displaying stereoscopic panorama images constructed in accordance with the invention;

FIGS. 7 and 7A schematically depicts a stereoscopic panorama recording and generating system constructed in accordance with a third embodiment of the invention;

FIG. 8 schematically depicts a stereoscopic panorama recording and generating system constructed in accordance with a fourth embodiment of the invention;

FIG. 9 schematically depicts a stereoscopic panorama recording and generating system constructed in accordance with a fifth embodiment of the invention;

FIG. 11 schematically depicts a first arrangement for displaying a stereoscopic panorama image to a viewer.

DETAILED DESCRIPTION OF AN ILLUSTRATIVE EMBODIMENT

Figure 3:
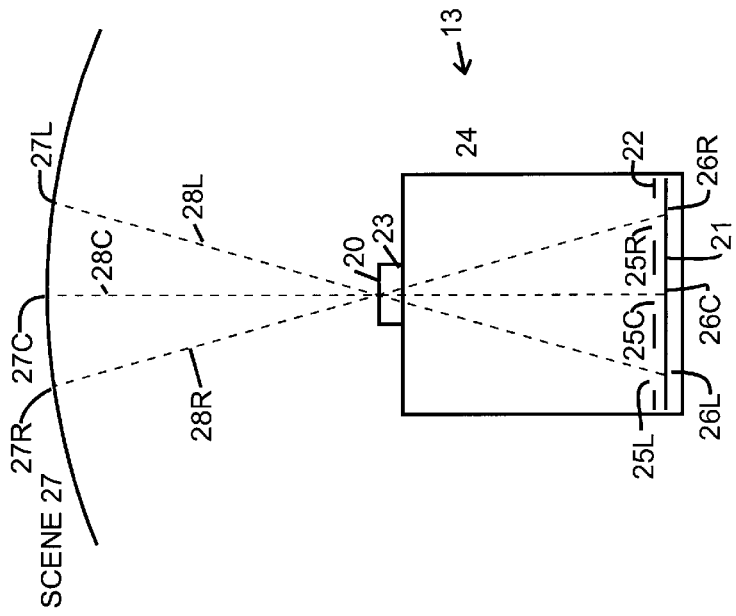
FIG. 3 schematically depicts a camera used in the stereoscopic panorama recording and generating system depicted in FIG. 2.

The invention provides systems and methods for generating stereoscopic panoramic images of a scene, and for displaying the images to a one or more viewers in a manner so that the viewer(s) can view the panoramic images stereoscopically. Before describing the inventive systems and methods, it would be helpful to first describe what a stereoscopic panoramic image is and generally how the various systems and methods described herein generate the stereoscopic panoramic images and facilitate their display. This will be done in connection with FIGS. 1A and 1B. With reference initially to FIG. 1A that FIG. schematically depicts an observer, and, particularly, eyes represented by dots 2L and 2R (generally identified by reference numeral "2L/R") standing vertically and observing a point P in a scene. The observer sees point P by means of rays of light reflected from the point and directed toward the eyes 2L and 2R along respective rays represented by dashed arrows 3L and 3R. It will be appreciated that, since the rays 3L and 3R are not parallel, the observer will be able to observe a depth in connection with the region of the scene at and near point P.

The observer typically can see only a small portion of the 360° panorama around himself or herself. To see more of the panorama, the observer will rotate his or her head in, for example, the direction indicated by the arrow identified by reference numeral 4. Rotation of the head will allow the observer to view other points (not shown) in the scene, along rays (also not shown) that rotate with him or her. If the observer rotates around a full 360°, each eye will revolve around the same viewing circle 5.

It will be apparent from FIG. 1A that each the succession of images as seen by the observer's two eyes as he or she rotates, can be separated into separate sets of images, with one set of images being associated with each eye. This will be described in connection with FIG. 1B. FIG. 1B. depicts the viewing circle 5 divided into separate viewing circles 5L and 5R (generally 5L/R) for the respective left and right eyes, with point P being shown in the same position as in FIG. 1A, with respect to each viewing circle 5L/R, and the associated ray 3L(1) and 3R(1), which correspond to rays 3L and 3R depicted in FIG. 1A. Each viewing circle 5L/R also depicts other rays, identified by reference numerals 3L(2), . . . , 3L(N) (generally identified by reference numeral 3L(n)) and 3R(2), . . . , 3R(N) (generally identified by reference numeral 3R(n)) that represent images that the respective left and right eyes of the observer will receive of the various points in the scene as he or she rotates in the direction represented by arrows 4L and 4R.

Further in connection with FIG. 1B, to facilitate the viewing of a stereoscopic panoramic image of the scene by a viewer, the images as would be received by each of the observer's eyes can be separately recorded and viewed by, or otherwise displayed to, the respective eyes of the viewer. Thus, if, for example, images are recorded around a circle corresponding to viewing circle 5L at successive points, in successive direction depicted by rays 3L(1), . . . 3L(N), and the images mosaiced together, and further images are recorded around a circle corresponding to viewing circle 5R at successive points, in successive direction depicted by rays 3R(1), . . . 3R(N), and if those images are suitably aligned (such that the point of intersection of the rays 3L(n) and 3R(n) are viewed in the same relative location) and displayed to respective eyes of a viewer, the viewer can see a stereoscopic panoramic image of the scene.

In a similar manner, stereoscopic panoramic images can be generated using computer graphics techniques. However, instead of the regular perspective projection used in conventional image rendering, the panoramic image for the left eye will be rendered using rays tangent to a circle such as viewing circle 5L, and the panoramic image for the right eye will be rendered using rays tangent to a circle such as viewing circle 5R.

The invention provides various arrangements for facilitating the recording of images from which left and right panoramic images can be generated, which, in turn, can be displayed to a viewer. Generally, left and right panoramic images can be generated by rendering from a model, or by recording a plurality of non-panoramic images and mosaicing together portions thereof to generate the left and right panoramic images. While in FIG. 1A, the eyes are depicted as viewing in a direction tangent to the viewing circle 5, it will be appreciated that in some embodiments the camera may instead be generally, although not precisely, perpendicular to the viewing circle.

Figure 2:
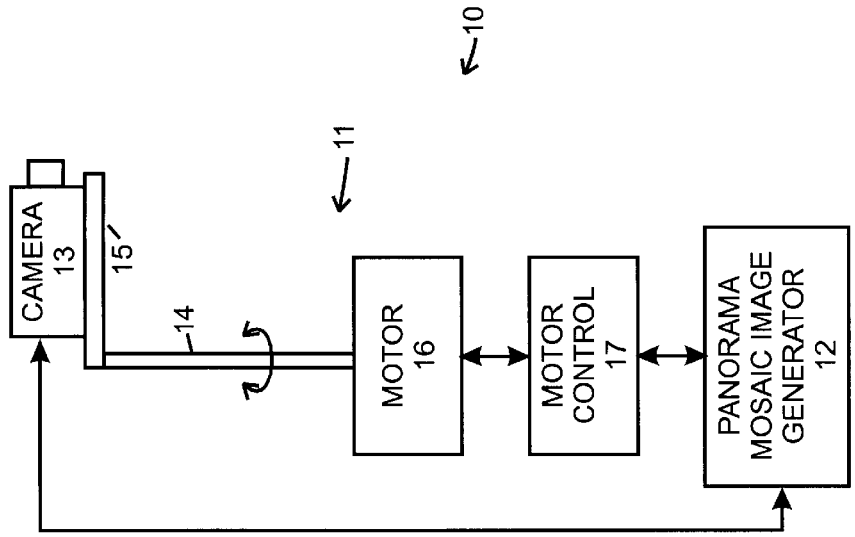
FIG. 2 schematically depicts a stereoscopic panorama recording and generating system constructed in accordance with one embodiment of the invention.

FIG. 2 schematically depicts a stereoscopic panorama recording and generating system 10 constructed in accordance with one embodiment of the invention. With reference to FIG. 2, system 10 includes a camera rig 11 and a panorama mosaic image generator 12. The camera rig 11 includes an image recording device such as a camera 13 mounted on a support comprising an upwardly (in the case of horizontally-recorded panoramas) extending mast 14 and an arm 15 rigidly affixed thereto and extending therefrom. The camera 13 may record images using any of a number of types of image recording media, including, for example, film, charge-coupled devices (CCD's) or the like. The camera 13 is rigidly mounted on the arm 15 so that the images recorded by the camera 13 will be recorded thereby a predetermined distance from the mast 14. A motor 16 is configured to rotate the mast 14 around a vertical axis, thereby to, in turn, cause the camera 13 to revolve along a curved path centered on the axis around which mast 14 rotates. The movement of the motor 16 is controlled by a motor control 17 which, in turn, is controlled by the panorama mosaic image generator 12, as will be described below. Since the camera 13 is rigidly affixed to the arm 15, the camera 13 will point in a direction defined by the arm 15. In one embodiment, the camera 13 is a still camera, as opposed to a motion picture camera, and in that embodiment the motor 16 will preferably be a stepping motor to enable the camera 13 to revolve step-by-step, with the camera 13 being stopped at each step to allow the camera 13 to record an image. In that case, the angle between steps will be such as to facilitate mosaicing images recorded at each step into a panoramic image, as will be described below in connection with FIGS. 2 and 3. At some point, each of the images recorded at successive steps will be provided to the panorama mosaic image generator 12 for processing. The panorama mosaic image generator 12, in turn, receives the images recorded at the successive steps and mosaics portions of the images together to generate therefrom a stereoscopic panoramic image pair comprising left and right panoramic images. The left and right panoramic images comprising the stereoscopic panoramic image pair may be displayed to or viewed by a user as will be described below in connection with FIG. 3 to provide the user with a stereoscopic image of the scene as recorded by the camera 13.

Figure 4:
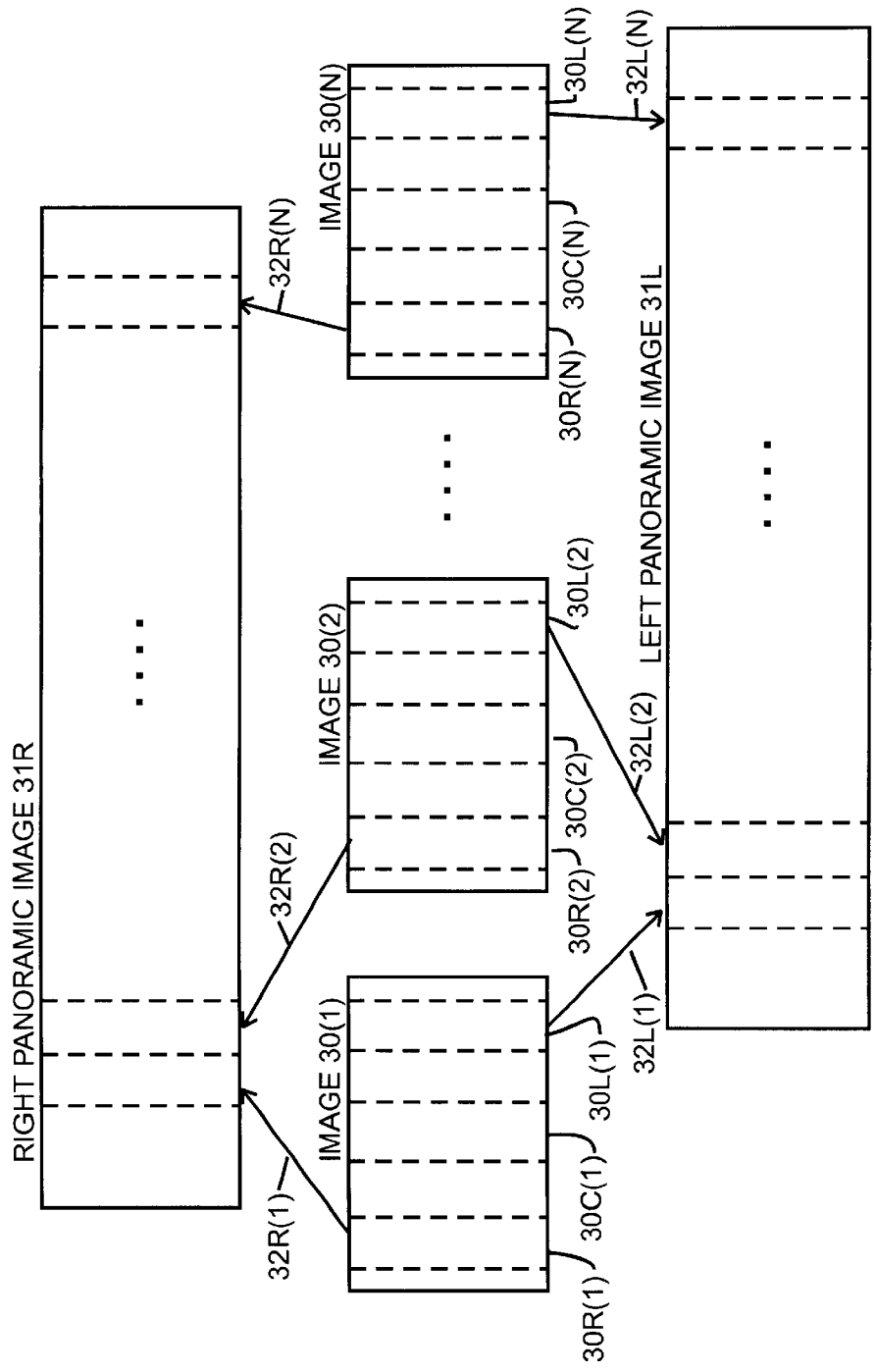
FIG. 4 depicts generation of left and right panorama images from images recorded by the camera depicted in FIG. 1B, useful in understanding the operation of the panoramic image generator of the stereoscopic panorama recording and generating system depicted in FIG. 2.

As noted above, the panoramic image is generated by mosaicing together portions of images recorded with the camera 13 at various angular positions around the center of rotation of the mast 14. Before proceeding further, it would be helpful to describe details of the camera 13 and how the panoramic image generator 12 mosaics portions of the images together to form a panoramic image pair that, when viewed simultaneously by an observer's left and right eyes, provides a unitary stereoscopic panoramic image of the scene surrounding the location of the mast 14. FIG. 3 is a top plan view depicting details of the interior of camera 13, as seen from the top in FIG. 2, and FIG. 4 depicts details of images recorded by the camera and how portions of those images are mosaiced together to form the stereoscopic panoramic image pair. With reference initially to FIG. 3, camera 13 includes a housing 24 having a forward aperture 20, a rear image recording medium 21, a screen 22 proximate to and forward of the image recording medium 21, and a shutter 23. The image recording medium 21, which defines an image plane for the camera 13, may comprise any convenient image recording medium, including film, a CCD array, or the like. The camera 13 may also include a lens (not shown) in the aperture 20 to facilitate focusing of images on the image plane. Alternatively, the camera 13 may comprise a pinhole camera, in which case no lens will be provided.

The shutter 23 is provided to selectively allow light reflected from portions of a scene 27 at which the camera 13 is directed is allowed to enter the camera and project upon the screen 22 and portions of the image recording medium 21 for recording thereby. The scene 27 forms part of a panoramic scene which is centered on the axis of rotation of the mast 14. Preferably, the shutter 23 will be closed while the motor 16 moves the camera 13 from one step to the next, thereby to block light from the scene 27 from entering the camera 13 and exposing the image recording medium 21 during such movement, which might otherwise cause blur in the recorded image. After the motor 16 has reached a next step and the camera 13 has stopped moving, the shutter 23 can be opened to allow light from the scene 27 to enter the camera and be directed rearwardly toward the screen 22 and image recording medium 21. After the image recording medium 21 has been appropriately exposed, the shutter can be closed, and the motor 16 energized to rotate the mast 14, thereby step the camera 13 to a new orientation, at which point these operations can be repeated. Preferably, if the image recording medium 21 is film, the film will be advanced before the shutter 23 is again opened so as to avoid double-exposure; similarly, if the image recording medium 21 is a CCD device, the image information can be retrieved and stored and the CCD's refreshed as necessary to avoid double exposure. The image recorded by the camera 13 at the respective steps will be independent of each other, so as to avoid multiple exposures.

The screen 22 is configured to generally cover portions of the image recording medium 21, except for at least two vertical slits 25L and 25R, which allow light from respective directions and portions 27L and 27R of the scene 27 to fall on proximate regions 26L and 26R of the image recording medium 21 and be recorded thereby. As is shown by the dashed lines 28L and 28R, the slit 25R is positioned to allow region 26R of the image recording medium 21 to record the left-hand portion 27R of the scene 27, and the slit 25L is positioned to allow region 26L of the image recording medium 21 to record the right-hand portion 27L of the scene 27. With reference to FIG. 1A, it will be appreciated that the portion 27R of the scene 27 as recorded by the region 26R of the image recording medium 21 is from a direction which corresponds to the direction that an observer's right eye would be viewing that portion 27R of the scene if he or she were looking directly at the portion 27R of the scene. Similarly, the portion 27L of the scene 21 as recorded by the region 26L of the image recording medium is from a direction which corresponds to the direction that the observer's left eye would be viewing that portion 27L of the scene if he or she were looking directly at the portion 27L of the scene. It will further be appreciated that, preferably the placement of the camera 13 on the arm 15 will be such that, as the camera 13 is rotated, the regions 26L and 26R revolve through a circle, namely, the image circle, and the rays shown by dashed lines 28L and 28R are tangent to an inner viewing circle similar to that described above in connection with FIGS. 1A and 1B. Thus, as the motor 16 steps the camera 13 so as to enable the region 26L of the image recording medium 21 to record what is depicted in FIG. 3 as portion 27R of the scene 27, an observer who contemporaneously views that image with the left eye, and with the right eye the image previously recorded in the region 27R of the scene 27, would see a stereoscopic image of that portion 27R of the scene 27. Similarly, when the motor 16 steps the camera 13 so as to enable the region 26R of the image recording medium 21 to record what is depicted in FIG. 3 as region 27L of the scene 27, an observer who contemporaneously views that image with the right eye, and with the left eye the image previously recorded in the region 27L of the scene 27, would see a stereoscopic image of that portion 27L of the scene 27.

In the embodiment depicted in FIG. 3, the screen 22 of camera 13 also is provided with a center slit 25C, which, when shutter 22 opens to allow light from the scene 27 to enter the camera 13, allows a center region 26C of the image recording medium 21 to record what is depicted in FIG. 3 as region 27C of the scene 27. It will be appreciated that the center region 26C is a direct view of the region, and the ray 28C approximately corresponds to the optical center of the camera.

As noted above, the images recorded by the camera 13 at successive steps around the center of rotation of the mast 14 can be mosaiced together by the panorama mosaic image generator 12 to provide left and right panorama images. The left and right panoramic images, when viewed simultaneously by an observer, in particular by the observer's left and right eyes, results in a stereoscopic panoramic image of the panoramic scene centered on the center of rotation of mast 14. The manner in which the left and right panoramic images are generated will be described in detail in connection with FIG. 4. With reference to FIG. 4, each of the images 30(1) through 30(N) (generally identified by reference numeral 30(n)) recorded at "N" (where "N" is an integer) successive steps around the center of rotation of the mast 14 includes a left image portion 30L(n) and a right portion 30R(n). The left image portion 30L(n) of each image 30(n), in turn, corresponds to the left region 26L as recorded on the image recording medium 21 at the "n-th" step, and the right image portion 30R(n) corresponds to the right region 26R as recorded on the image recording medium 21 at the same "n-th" step. The panorama mosaic image generator 12 receives the successive images 30(1), 30(2), . . . 30(N) and mosaics the left image portions 30L(1), 30L(2), . . . 30L(N) therefrom together to form the left panoramic image 31L, as indicated by the arrows 32L(1), 32L(2), . . . 32L(N). Similarly, the panorama mosaic image generator 12 mosaics the right image portions 30R(1), 30R(2), . . . 30R(N) therefrom together to form the right panoramic image 31R, as indicated by the arrows 32R(1), 32R(2), . . . 32R(N). The panorama mosaic image generator 12 can generate the left and right panoramic images 31L and 31R using any conventional technique for mosaicing images or portions of images together. It will be appreciated that the left and right panoramic images 31L and 31R conform to what an observer would see through his or her left and right eyes, respectively, as they revolve through the left and right viewing circles 5L and 5R described above in connection with FIG. 1B. The panoramic mosaic image generator 12 can generate the left and right panoramic images 31L and 31R as respective image strips, or it may form the images as respective continuous loops by mosaicing together their respective left and right ends. In addition, the images may be formed on or stored in any convenient medium, such as paper or film, in digital form in electronic or magnetic data storage, or other media as will be appreciated by those skilled in the art.

It will further be appreciated that the widths of the left and right image portions 30L(n) and 30R(n) of the respective images 30(n), which are generally related to the widths of the left and right slits 25L and 25R in the screen 22 (FIG. 3), will generally determine the angle to which the motor 16 will be constrained for successive steps. The angle between successive steps will be such as to ensure that the successive image portions 30L(1), 30L(2), . . . 30L(N) can be mosaiced together to provide a single and continuous left panoramic image 31L and the successive images 30R(1), 30R(2), . . . 30R(N) can be mosaiced together to provide a single and continuous right panoramic image 31R.

As noted above, in one embodiment, the screen 22 (FIG. 3) also has a center slit 25C to facilitate recording of a portion of the scene 27 in a center region 26C of the image recording medium, the portion being intermediate the portions recorded on the left and right regions 26L and 26R. The center image portions as recorded on the respective images 30(n) are identified in FIG. 2 by reference numeral 30C(n). In that case, the panorama mosaic image generator 12 can also generate a center panoramic image from center image portions 30C(n) of the successive images 30(n). While the center panoramic image so generated (which is not depicted in FIG. 4, may be used for stereo viewing together with one of the other two panoramic images 31L and 31R, it is preferable to use the left and right panoramic images 31L and 31R since the symmetry between the two images reduce distortion and increase stereoscopic disparity.

The distance of the camera 13 from the mast 14, as well as the separation between the left and right slits 25L and 24R, are selected such that for normal stereoscopy the radius of the viewing circle to which all rays 28R, 28L are tangent, approximates the distance between a person's eyes, which, in turn, approximately corresponds to the diameter of the viewing circle described above in connection with FIG. 1A. It will be appreciated that, the diameter of the viewing circle can be enlarged or reduced for exaggerated or reduced stereo.

Figure 5:
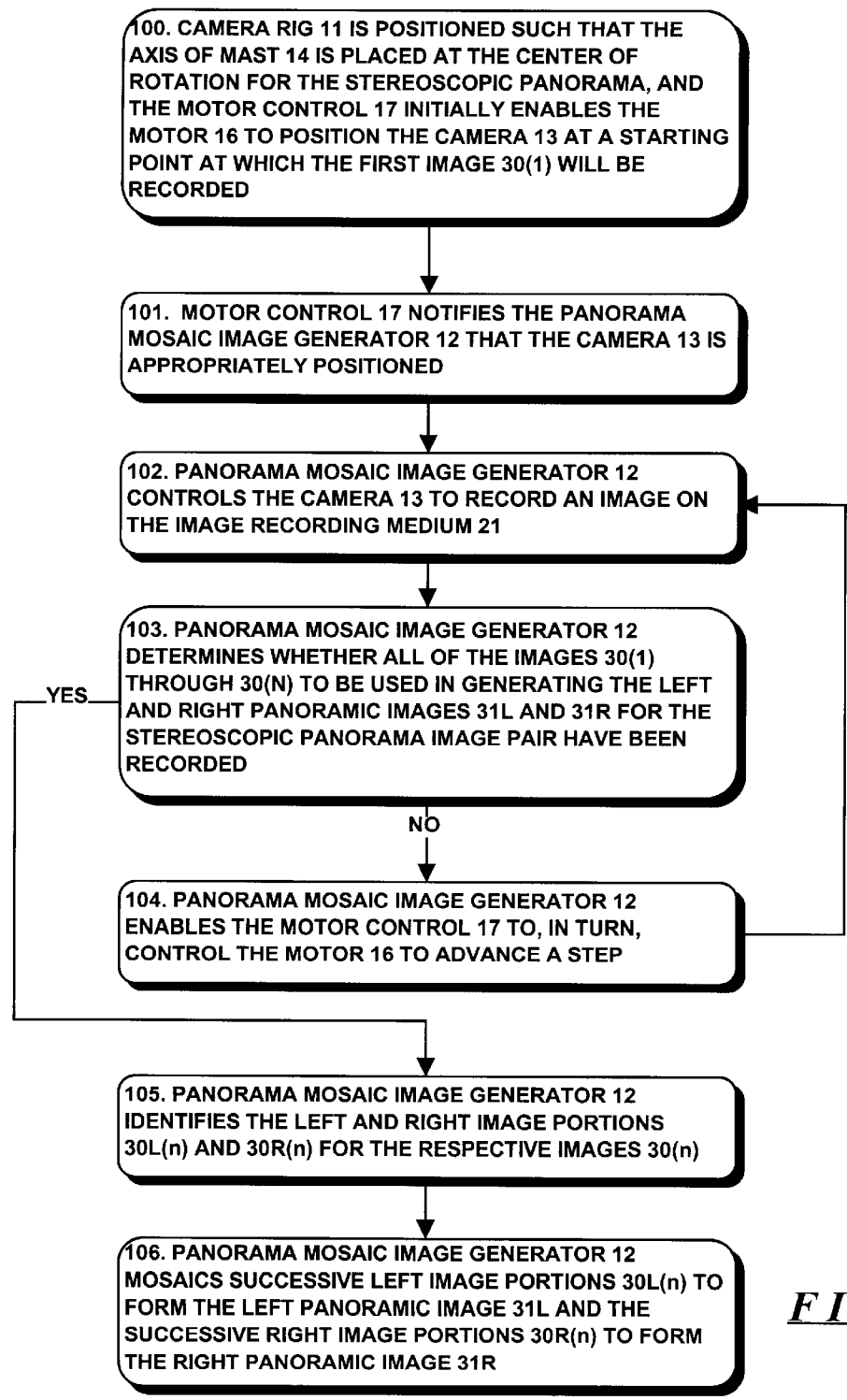
FIG. 5 depicts a flow chart describing operations performed by the stereoscopic panorama recording and generating system.

With this background, operations performed by the stereoscopic panorama recording and generating system 10 in connection with generating the left and right panoramic images 31L and 31R will be described in connection with the flow chart in FIG. 5. With reference to FIG. 5, after the camera rig 11 has been positioned such that the axis of mast 14 is placed at the center of rotation for the stereoscopic panorama, the motor control 17 initially enables the motor 16 to position the by camera 13 at a starting point at which the first image 30(1) will be recorded (step 100). After the camera 13 is appropriately positioned, the motor control 17 notifies the panorama mosaic image generator 12 (step 101).

Thereafter, the stereoscopic panorama recording and generating system 10, in a number of iterations, records successive images 30(1), 30(2), . . . 30(N) at successive steps around the center of rotation of mast 14. In each iteration, the panorama mosaic image generator 12 controls the camera 13 to record an image, in the first iteration image 30(1), on the image recording medium 21 (step 102). In that operation, the panorama mosaic image generator 12 can enable the camera shutter 23 to open to facilitate exposure of the image recording medium 21. After the image recording medium 21 has been suitably exposed, the shutter 23 will be closed. Thereafter, if the camera 13 uses film as the image recording medium 21, the film can be advanced. Alternatively, if the camera 13 uses a CCD array as the image recording medium 21, the panorama mosaic image generator 12 can enable the image to be stored by a storage medium (not shown) maintained by the camera 13, or downloaded to it (that is, the panorama mosaic image generator 12) for storage.

After the image has been recorded by the image recording medium 21 in step 102, the panorama mosaic image generator 12 will determine whether all of the images 30(1) through 30(N) used in generating the left and right panoramic images 31L and 31R for the stereoscopic panorama image pair have been recorded (step 103). If the panorama mosaic image generator 12 makes a negative determination in step 103, that is, if it determines that all of the images 30(1) through 30(N) needed for the stereoscopic panorama image pair have not been recorded, it will enable the motor control 17 to, in turn, control the motor 16 to advance a step (step 104). Thereafter, operations return 13 to step 102 to facilitate recording of another image 30(2).

The stereoscopic panorama recording and generating system 10 performs steps 102 through 104 through a plurality of iterations, in each iteration recording an image 30(n) at each successive step around the center of rotation of mast 14, until the panorama mosaic image generator 12 determines in step 103 that all of the images 30(1) through 30(N) needed for the stereoscopic is panorama image pair have been recorded. At that point, the panorama mosaic image generator 12 can begin processing the recorded images 30(n) to generate the stereoscopic panorama image pair. In that operation, the panorama mosaic image generator 12 can initially identify the left and right image portions 30L(n) and 30R(n) for the respective images 30(n) (step 105) and mosaic successive left image portions 30L(n) to form the left panoramic image 31L and the successive right image portions 30R(n) to form the right panoramic image 31R (step 106). The panorama mosaic image generator 12 generate the left and right panoramic images 31L and 31R in step 106 using any convenient mosaicing technique.

Figure 6:
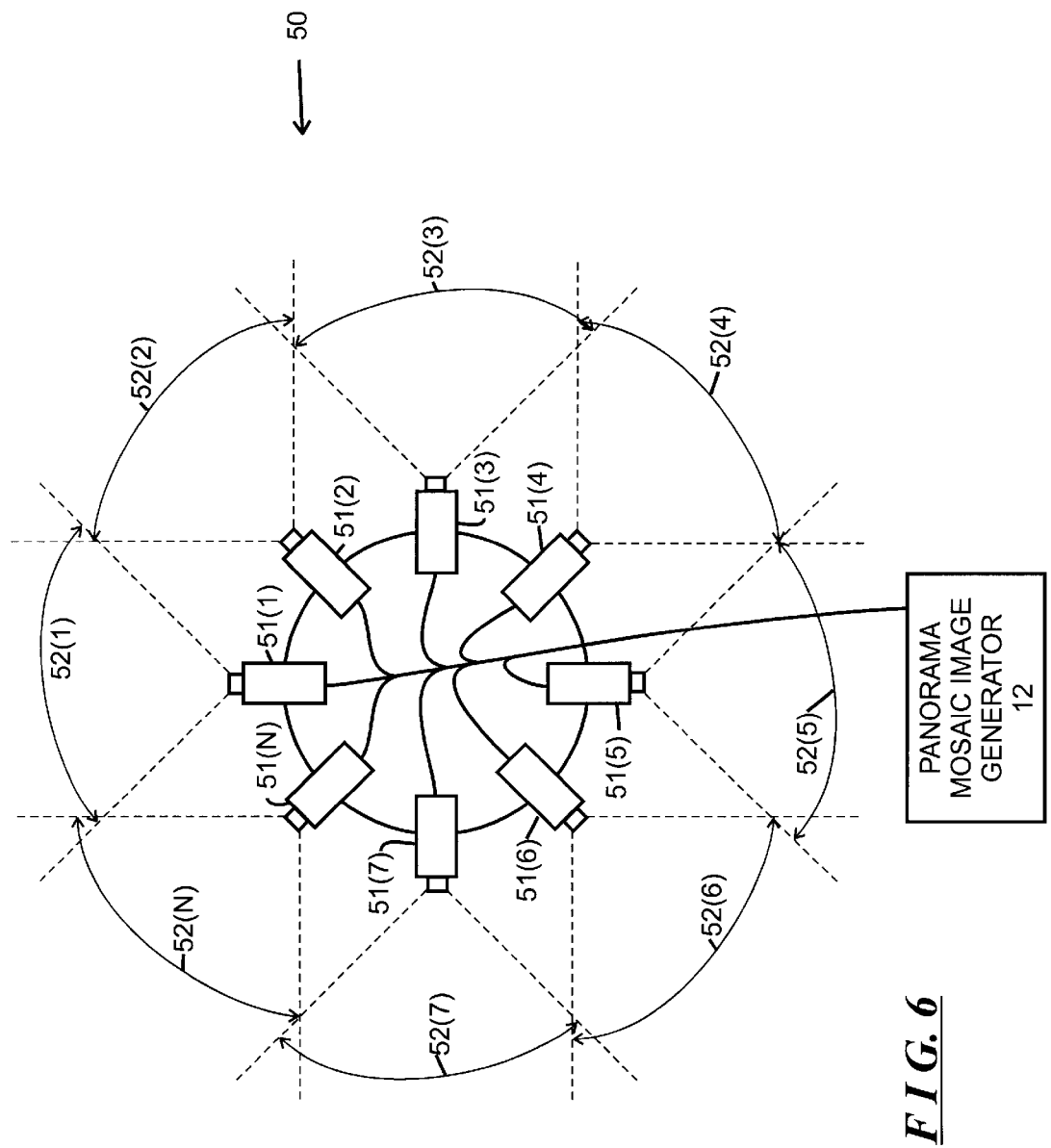
FIG. 6 schematically depicts a stereoscopic panorama recording and generating system constructed in accordance a second embodiment of the invention.

Although the stereoscopic panorama recording and generating system 10 described above in connection with FIG. 2 makes use of a single camera mounted on mast 14 and arm 15 and rotated by the motor 16 and motor control 17 through the arc required to generate the panoramic image of the scene 27, other arrangements may be used. For example, rather than using a motor controller, the rotation of the mast can be approximated by measuring image motion from the video frames using computer vision techniques. As another example, FIG. 6 schematically depicts a second embodiment of the system, identified by reference numeral 50, in which a number of cameras are mounted in a circle. It will be appreciated that, preferably, the diameter of the circle is selected in the same way as the rotating camera system described above in connection with FIG. 2, that is, so that the rays from the left slits and the rays from the right slits of all cameras should be tangent to an inner viewing circle, which will correspond to the diameter of the viewing circle 5 described above in connection with. FIG. 1A. The cameras can record the images of the scene contemporaneously, and thereafter the images can be processed to generate the left and right panoramic images in the same manner as that described above in connection with FIG. 4. With reference to FIG. 6, the stereoscopic panorama recording and generating system 50 includes a plurality of cameras 51(1) through 51(N) (generally identified by reference numeral 51(n) supported by a circular support 52. The number "N" of cameras will correspond to the number required to generate the number "N" of images 30(N) required to provide the left and right image portions 30L(n) and 30R(n) sufficient to generate the left and right panoramic images 31L and 31R. The cameras 51(n) may be similar to the camera 13 (FIG. 2) used in stereoscopic panorama recording and generating system 10 described above in connection with FIGS. 1 and 2. Each of the cameras 51(n) will have a particular field of view 52(n) represented by the dashed lines 52L(n) and 52R(n), and arrow 53(n). The number of cameras "N," their respective field of views 52(n) and their disposition around circular support 52 will be sufficient to ensure that sufficient numbers of left and right image portions 30L(n) and 30R(n) will be recorded to ensure that the left and right panorama images 31L and 31R are continuous.

In the systems 10 (FIG. 2) and 50 (FIG. 6), the cameras 13 and 51(n) were described as either pinhole cameras or cameras with lenses for focusing the images from the scene 27 onto the image recording medium 26. In other embodiments, described in connection with FIGS. 7 through 9 mirrors are used to reflect images of the scene 27 toward the camera. FIGS. 7 through 9 specifically depict, in schematic form, the image recording components (essentially analogous to the camera rig 11 depicted in FIG. 2) for respective stereoscopic panorama recording and generating systems, and do not depict the panoramic mosaic image generator 12 which also be included in such a system. With reference initially to FIG. 7, that FIG. schematically depicts a top view of a camera rig 60 including a multi-sided CCD array 61 and a mirror array 62. In one embodiment, the CCD array 61 is multi-sided, as seen from the top, with each side 60(1) through 60(S) (generally identified by reference numeral 60(s)) having two CCD devices 61(s)(L) and 61(s)(R) (generally identified by reference numeral 61(s)(l/r)). In the illustrative embodiment depicted in FIG. 7, the CCD array 61 is in the form of an octagon, as seen from the top, in which case "S" equals "eight." As noted above, FIG. 7 depicts the CCD array 61 from above, and it will be appreciated that, a side 60(s) will preferably, when viewed from the front, have a square or rectangular configuration, as shown in FIG. 7A. Similarly, each of the CCD devices 61(s)(l/r) will preferably have a square or rectangular configuration when the respective side 60(s) is viewed from the front. Preferably the CCD devices 61(s)(l/r) on each side 60(s) will be symmetrically disposed on opposite sides of a vertical line 63 that vertically bisects the respective side 60(s).

Displaced from each side 61(s) of the octagonal CCD array 61 is a respective mirror 64(s), with each mirror 64(s) comprising left and right mirror faces 65(s)(L) and 65(s)(R) (generally identified by reference numeral 65(s)(l/r)) which are generally disposed at a predetermined angle with respect to each other, with the vertex 66(s) pointing towards the center of the respective side 60(s) of the CCD array 61, and parallel to the vertical line 63 that vertically bisects the respective side 60(s). The respective mirror face 65(s)(l/r), is disposed to direct an image of a portion of a scene towards the correspondingly-indexed CCD device 61(s)(l/r).

The left and right mirror faces 65(s)(L) and 65(s')(R) (s'=s+1, modulo S), of proximate mirrors of proximate mirrors 64(s) and 64(s') serve to direct images of a scene for recording by the respective left and right CCD device 61(s)(L) and 62(s')(R). This will be apparent from the following. Generally, as shown in FIG. 7, respective rays 70(s)(L) and 70(s')(R) from a scene (not shown) are reflected from the respective mirror faces 65(s)(L) and 65(s')(R) toward the respective CCD devices 61(s)(L) and 61(s)(R). It will be apparent that the rays 70(s)(L) and 70(s)(R) are generally from the left and right directions of a portion of a scene. Thus, the image as recorded by the combination of the CCD device 62(1)(L) and 62(2)(R), as provided by the respective mirror faces 65(1)(L) and 65(2)(R) will comprise the appropriate left and right images for a particular region of a scene.

The images recorded by successively-indexed CCD devices 61(s)(L) are mosaiced together to provide a left panoramic mosaic image. Similarly, the images recorded by successively-indexed CCD devices 61(s)(R) may be mosaiced together to provide a right panoramic mosaic image.

FIG. 8 depicts a plan view, as seen from the top, of image recording components comprising a camera rig 80 for a stereoscopic panorama recording and generating system which makes use of a single fixed camera and a rotating planar mirror. With reference to FIG. 8, the camera rig 80 includes a camera 81 and a planar mirror 82. Camera 81 is generally a conventional camera. Mirror 82 will typically be mounted on a vertical post (not shown) and rotated by motor (also not shown) in a manner similar to the manner in which camera 13 and arm 15 are rotated by motor 16 and motor control 17, as described above in connection with FIG. 2. The mirror 82 will preferably be in rectangular form, the top edge of which is depicted in FIG. 8. The mirror 82 reflects an image from a scene 83 toward the camera 81 along a line indicated by dashed line arrow 84. Since the image provided to the camera 81 is a reflected one, the virtual point of view, or center of projection, of the camera is defined by the dashed line arrow 85. As the mirror is rotated, the portion of the scene 83 which is reflected toward the camera rotates around a circle centered on the center of rotation of the mirror of which directed virtual point of view of the camera 81 moves around the circle 86. As the mirror 82 is rotated, the camera 81 records a series of images, similar to images 30(n) described above in connection with FIG. 4. A panoramic mosaic image generator can mosaic together left and right image portions of the images to generate left and right panoramic images, in a manner similar to that described above in connection with FIG. 4.

Since the image provided to the camera 81 is a reflected one, the virtual point of view, or center of projection, of the camera is defined by the dashed line arrow 85. As the mirror is rotated, the portion of the scene 83 which is reflected toward the camera rotates around a circle centered on the center of rotation of the mirror of which directed virtual point of view of the camera 81 moves around the circle 86. As the mirror 82 is rotated, the camera 81 records a series of images, similar to images 30(n) described above in connection with FIG. 4. A panoramic mosaic image generator can mosaic together left and right image portions of the images to generate left and right panoramic images, in a manner similar to that described above in connection with FIG. 4.

FIG. 9 depicts a plan view, as seen from the top, of image recording components comprising a camera rig 10 for a stereoscopic panorama recording and generating system which makes use of a single fixed camera and a curved mirror. With reference to FIG. 9, the camera rig 100 includes a camera 101 and a curved mirror 102. Camera 101 is a conventional camera, such as a conventional film or video camera. The mirror 102 will preferably have a curved reflective surface, as depicted in FIG. 9. The mirror 102 is curved so as to reflect an image from a scene 105 toward the camera 101 along rays indicated by dashed line arrows generally indicated by reference numeral 104. Generally, the mirror 102 is constructed, and the camera 101 is placed, so that rays from the scene 105, are directed to the optical center of the camera as indicated by reference numeral 106. In that process, light rays reflected from the scene, and projected tangent to an imaginary viewing circle 103, will reflect off the mirror 102 and be directed towards the optical center of the camera. The camera 101, in turn, is located so as to receive and record the image represented by the light rays passing through the optical center. It will be apparent that the curved mirror 102 facilitates the recording of an image of scene 105 that subtends a relatively wide angled arc, generally up to approximately 180 degrees.

Camera rig 100 may be fixed, in which case it will record images of only the scene 105 as shown in FIG. 9. To cover a full 360 degrees, an illustrative embodiment may use six such camera rigs, with three of the rigs being used to cover 360 degrees for the left eye and three being used to cover 360 degrees for the right eye. Alternatively, camera rig 100 may be mounted to rotate a center of rotation centered on the imaginary viewing circle 103. Any convenient support (not shown) may be provided to support the camera 101 and mirror 102. The support will be is mounted on a vertical post (not shown), with the assembly being rotated by motor (also not shown), all in a manner similar to the manner in which camera 13 and arm 15 are rotated by motor 16 and motor control 17, as described above in connection with FIG. 2. As the assembly is rotated, the camera 101 records a In series of images, similar to images 30(n) described above in connection with FIG. 4. A panoramic mosaic image generator can mosaic together left and right image portions of the images to generate left and right panoramic images, in a manner similar to that described above in connection with FIG. 4.

Figure 10:
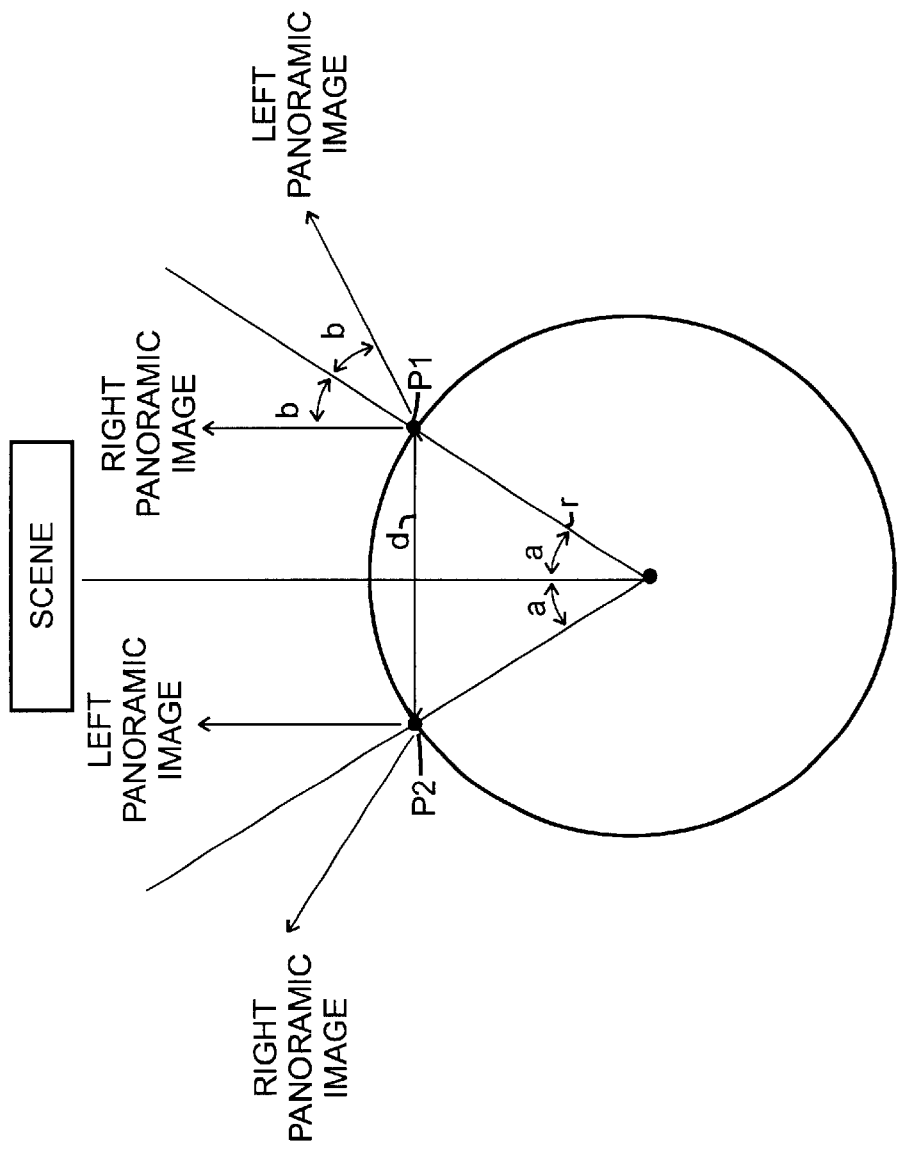
FIG. 10 is useful in understanding generation of a stereoscopic panorama image pair using computer graphics techniques.

As noted above, the invention also provides arrangements by which a panoramic mosaic image generator, such as generator 12, can generate panoramic stereoscopic image pair using computer graphics techniques. Operations performed by the panoramic mosaic image generator in this connection will be described in connection with FIG. 10. Generally, the panoramic mosaic image generator synthesizes images for cameras located on a circle 110. For normal stereoscopic effects, the radius of the circle 110 should be on the order of the radius of the human head, and the angle "a" should be such that d=2r sin a approximately corresponds to the distance between human eyes. If angle "b" approximately corresponds to angle "a," at every position on the circle 110, an image is synthetically generated in two viewing directions, one for the left panoramic image 31L and the other for the right panoramic image 31R, as shown in FIG. 10. As shown in FIG. 10, the viewing direction at each camera position P1, P2, . . . , is to the right for the image to be used in generating the left panoramic image 31L and to the left for the image to be used in generating the right panoramic image 31R. All of the images generated at the successive camera positions are mosaiced together to create the left and right panoramic images.

The invention is further directed to systems for displaying the left and right panoramic images 31L and 31R (FIG. 4) generated by the panoramic mosaic image generator 12 to a viewer, thereby to enable the viewer to view the panorama represented thereby stereoscopically. Several illustrative panoramic image display systems will be described in connection with FIGS. 11 through 12B. With reference to FIG. 11, that FIG. schematically depicts a panoramic image display system 120 which includes goggles which a viewer may wear over his or her eyes. Generally, the panoramic image display system 120 includes left and right display devices 121L and 121R, a display control module 122, left and right display controllers 123L and 123R and a pointing stick 124. The left and right display devices 121L and 121R may be worn by the viewer as goggles over the respective left and right eyes. The left and right display devices 121L and 121R may comprise any convenient devices, including, for example, thin-film-transistor active matrix display devices, liquid crystal devices, and the like. The left and right display devices 121L and 121R may be mounted in any convenient arrangement which will hold them in front of the viewer's respective eyes, including, for example, spectacle frames, masks and the like. The left and right display controllers 123L and 123R, under control of the display control module 122, enable the respective a left and right display devices 121L and 121R to display at least selected portions of the respective left and right panoramic images 31L and 31R, so that they may be viewed by the viewer. The display control module enables the left and right panoramic images will be aligned so as to display images relating to the same portion of the panorama at the same relative position in the viewer's field of vision, as described above in connection with FIG. 1B. The viewer can use the pointing stick 124 to control the display control module to adjust the particular portion of the scene that is directly in front of the viewer's eyes, which is similar to controlling the angular position of an observer in viewing the scene as described in connection with FIG. 1A.

Since the geometrical shape of the surface on which the panoramic image is recorded may be different from the geometrical shape of the surface on which the image is displayed, some geometrical transformation on the image may be needed to avoid distortions. For example, the rotating camera system of FIG. 2 generates the panoramic stereo image on a cylindrical surface. When the image is displayed using goggles having flat screens, the image should preferably be rectified using a cylinder-to-plane transformation before the display. On the other hand, no rectification may be needed when the cylindrical image is displayed on a cylindrical theater as in FIG. 11A.

Figures 12A, 12B:
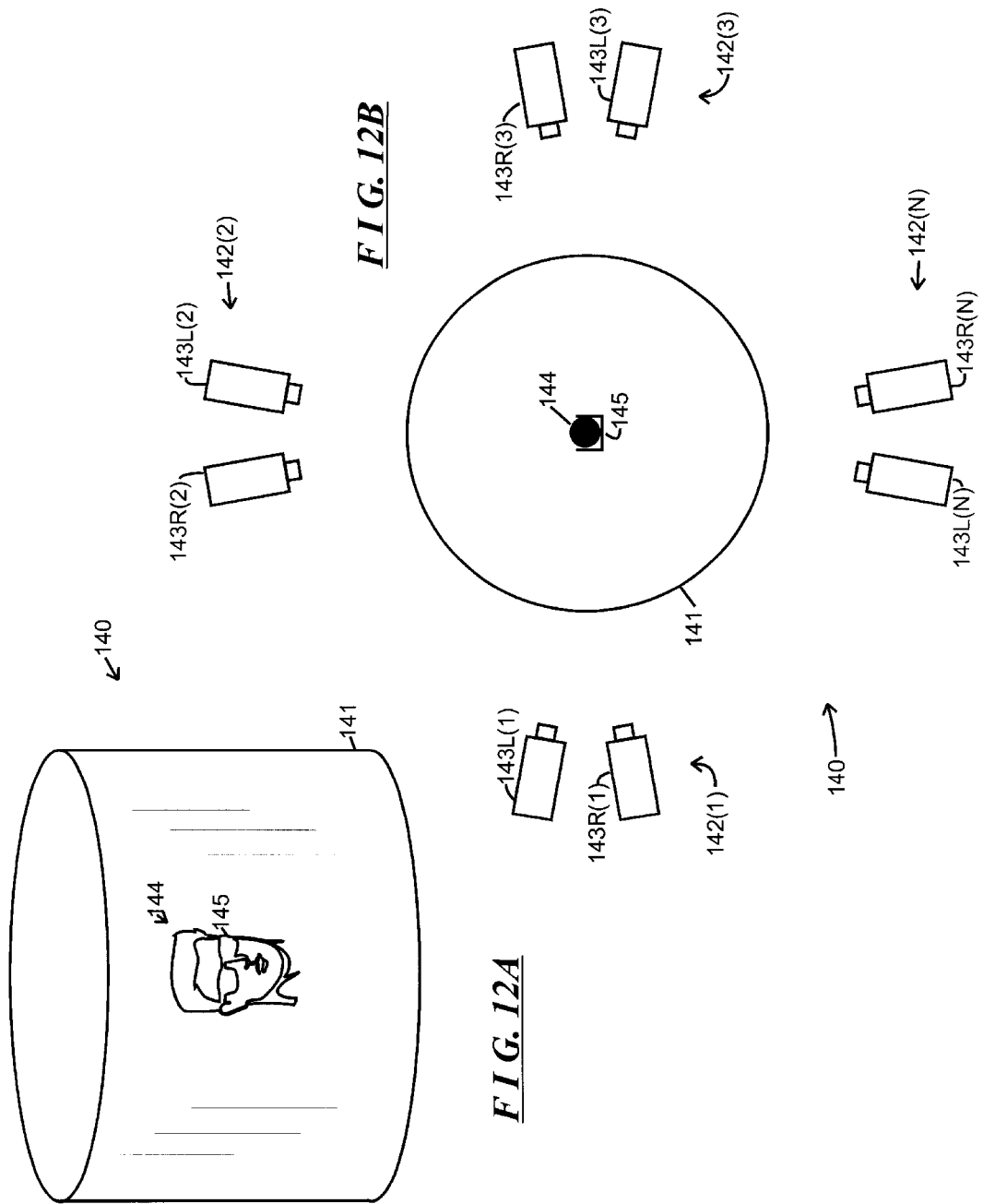
FIGS. 12A and 12B together schematically depict a second arrangement for displaying a stereoscopic panorama image to a viewer.

FIGS. 12A and 12B schematically depict an omni-directional theater arrangement for displaying a stereoscopic panorama to a viewer, with FIG. 12A generally depicting a plan view and FIG. 12B depicting a top view. In the arrangement depicted in FIGS. 12A and 12B, the left and right panoramic images 31L and 31R are projected onto the surface of a cylindrical screen so that they are visible by a viewer positioned interiorly of the space subtended by the screen. The images may be polarized in orthogonal directions, and a viewer, positioned interiorly of the space subtended by the screen and wearing polarized glasses, can view the panoramic image on the screen stereoscopically. The images comprising the respective left and right panoramic images 31L and 31R may be projected by projectors located within the space subtended by the screen, or from locations external thereto. Since the images are polarized orthogonal to each other, the polarization of the lenses of the glasses worn by the viewer will allow each of the viewer's eyes to receive a respective one of the images projected onto the screen.

Thus, and with reference to FIGS. 12A and 12B, an omni-directional theater 140 includes a cylindrical screen 141 and a plurality of projector sets 142(1) through 142(N) (generally identified by reference numeral 142(n)), each including two projectors 143L(n) and 143R(n). Each of the projectors 143L(n) and 143R(n) in each projector set 142(n) projects a portion of the respective left and right panoramic images 31L and 31R onto a respective portion of the screen 141. The number of projection sets 142(n) is preferably selected so that the images as displayed will not be distorted, and the portions of the left and right panoramic images 31L and 31R that are displayed by the respective projector sets 142(n) will be such as to provide continuous images around the screen 141, thereby to provide a panoramic image. The projector sets 142(n) may be positioned to project their images onto the exterior of the screen 141 as shown in FIG. 12B, provided the screen 141 is such as would allow the projected images to be viewed interiorly of the space subtended by the screen 141. Alternatively, the projector sets 142(n) may be positioned to project their images onto the interior of the screen 141. A viewer 144, standing interiorly of the space subtended by the screen 141, wearing polarized glasses 145, will be able to view the panoramic image stereoscopically.

It will be appreciated by those skilled in the art that, in addition to the use of polarization, stereo viewing can be done using any other method of stereo separation. This includes stereo glasses with shutters, which work in accordance with alternating display of "left" and "right" images. The glasses have fast shutters, which are transparent at the left eye, while opaque at the right eye, when the left image is displayed, and the opposite when the right image is displayed. Another arrangement is the use of "Anaglyph Stereo" with green-red glasses.

The invention provides a number of advantages. In particular, the invention provides systems and methods for generating stereoscopic panoramic images of a scene, and for displaying the images to an observer in a manner so that the viewer can view the panoramic images stereoscopically.

It will be appreciated that a number of modifications may be made to the systems and methods as described herein. For example, although the system described in connection with FIG. 2 has been described as providing left and right panoramic images by enabling the camera 13 to rotate around a fixed point, it will be appreciated that the system may instead enable the camera 13 to translate along a line, thereby to provide for an elongated panoramic image.

In addition, although the systems as described herein have been described as recording and displaying a static panoramic image, it will be appreciated that the systems may be used to record and display motion pictures stereoscopically. For example, systems such as those described in connection with FIGS. 6 through 8, which do not make use of a revolving camera, mirror or the like, can be translated as necessary along a path and record 360° panoramic images as they are translated. Systems such as those described in connection with FIGS. 2, and 8, which do make use of a revolving camera, mirror or the like, can also be translated while they are being revolved. However, in the latter case, it will be appreciated that, to provide a complete panorama, the camera and/or mirror will need to be translated as well as revolved. The camera and/or mirror can be revolved through a complete 360° circle before it is translated slightly and the operation repeated. Alternatively, if the translation is relatively slow, so that there is a substantial overlap so as to allow for a fairly complete panorama as the camera and mirror is translated, they may be translated while one or both are revolved. In either case, it will be appreciated that the panoramic mosaic image generator 12 generate a series of left and right panoramic images 31L and 31R, which can be successively displayed to a viewer. For example, the panoramic image display system 120 will enable the left and right display devices 121L and 121R to display the successive left and right panoramic images. Similarly, in the omni-directional theater arrangement 140, the left and right projectors 143L(n) and 143R(n) of the respective projector sets 142(n) will be enabled to project respective portions of the left and right panoramic images 31L and 31R on respective portions of the screen 141. It will be appreciated that the advancement of left and right panoramic images the left and right display devices 121L and 121R, and by projectors in the various projector sets, an as among the various projector sets, will be synchronized manner so that left and right images 31L and 31R as displayed will be from the same panorama.

In addition, although the camera 13 has been described as including a screen 22 having left and right slits 25L and 25R, it will be appreciated that a camera 13 need not include a screen. Instead, the panoramic mosaic image generator may use sections from the respective left and right-hand portions of the images 30(n) in generating the respective left and right panoramic images 31L and 31R.

In addition, although the panoramic image display system 120 has been described as making use of a pointing stick to control the angular position of the center of the stereo panoramic image relative to the viewer's eyes, it will be appreciated that other devices may be used, including, for example, arrangements such as trackers for determining changes in the position or angular orientation of the viewer's head.

Furthermore, although the invention has been described as including an arrangement for recording images for use in connection with generation of the left and right panoramic images 31L and 31R, which may be displayed to a viewer, it will be appreciated that the left and right panoramic images 31L and 31R may instead be generated using computer graphics techniques.

It will be appreciated that systems constructed in accordance with the invention may find utility in a number of applications, including, for example, recording of sporting events for later reporting or analysis, during travel, and for use in education and marketing. In addition, systems constructed in accordance with the invention may find utility in connection with robotics and computer video games. Furthermore, although the invention has been described in connection with specific display arrangements, it will be appreciated that other types of arrangements, such as display on computer monitors, televisions and the like may also find utility.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A system for generating a stereoscopic panoramic mosaic image pair comprising:
   A. a strip generator module configured to generate two series of image strips, all of said image strips in each series comprising strips of a series of images of a scene as would be recorded by a camera from a respective series of positions relative to the scene, the image strips of the respective series representing strips of the respective images displaced from one another by at least one selected displacement; and
   B. a mosaic image generator module configured to mosaic the respective series of images strips together thereby to construct two panoramic mosaic images, the panoramic mosaic images comprising the stereoscopic panoramic mosaic image pair providing a stereoscopic image of the scene as recorded over the path.

2. A system as defined in claim 1 in which the series of positions define a path at least a portion of which corresponds to a curved arc.

3. A system as defined in claim 1 in which the series of positions define a path at least a portion of which corresponds to a straight line.

4. A system as defined in claim 1 in which the series of positions define a translation relative to the scene.

5. A system as defined in claim 1 in which the series of positions define a change in angular orientation relative to the scene.

6. A system as defined in claim 1 in which the image strips are parallel to an axis defined for the respective image.

7. A system as defined in claim 6 which the axis is horizontal.

8. A system as defined in claim 6 in which the axis is vertical.

9. A system as defined in claim 1 in which the strip generator module includes a camera configured to record at least one image strip.

10. A system as defined in claim 9 in which the camera is configured to record a plurality of image strips from both series.

11. A system as defined in claim 10 in which the strip generator module includes a plurality of cameras configured to record at least image strips from both series, the plurality of cameras being disposed at respective positions along the path.

12. A system as defined in claim 9 in which the strip generator module further includes
   A. a reflector configured to reflect images of the scene to the camera for recording thereby of at least the image strips; and
   B. a reflector position control module configured to position the reflector at least one position to facilitate definition of the path.

13. A system as defined in claim 12 in which the reflector has at least one flat portion.

14. A system as defined in claim 12 in which the reflector has at least one curved portion.

15. A system as defined in claim 12 in which the reflector position control module is configured to position the reflector at a plurality of positions to facilitate definition of the path.

16. A system as defined in claim 1 in which the strip generator module is configured to generate at least one image strip using a selected computer graphics methodology.

17. A system as defined in claim 16 in which the strip generator module is configured to generate a plurality of image strips, at least one of the plurality of image strips being generated using the selected computer graphics methodology.

18. A system as defined in claim 1 in which the strip generator module is configured to generate the two series of image strips such that the displacement varies as between at least two images.

19. A system as defined in claim 18 in which the strip generator module includes
   A. a camera configured to record a plurality of images; and
   B. a strip selector module configured to select at least two image strips from respective ones of the images, one of the selected image strips from each of the images being associated with one of the respective series, the strip selector module being configured to control the locations in the respective images from which the image strips are selected thereby to provide the respective displacements.

20. A system as defined in claim 19 in which the strip selector module is configured to control the locations in the respective images from which the image strips are selected by controlling the separations of the image strips in the respective images.

21. A system as defined in claim 18 in which the strip generator module is configured to generate at least some of said image strips using a selected computer graphics methodology.

22. A system as defined in claim 1 in which:
   A. the strip generator module is further configured to generate a third series of image strips, all of said image strips in said third series comprising strips of a series of images of a scene as would be recorded by a camera, the image strips of the third series being displaced from the image strips of the other two series by another selected displacement; and
   B. the mosaic image generator module is further configured to mosaic the third series of images strips together thereby to construct a third panoramic mosaic image, a selected two of the panoramic mosaic images comprising the stereoscopic panoramic mosaic image pair.

23. A system as defined in claim 1 in which:
   A. the strip generator module is further configured to generate camera position information representing positions of the camera associated with the respective image strips; and
   B. the mosaic image generator module is further configured to use the camera position information in constructing the panoramic mosaic images.

24. A system as defined in claim 1 in which the mosaic image generator module is configured to generate at least one of the panoramic mosaic images by measuring image motion between successive image strips using a selected computer vision technique.

25. A system for generating a stereoscopic panoramic mosaic image pair comprising:
   A. a strip generator module configured to generate two series of image strips, all of said image strips in each series comprising strips of a series of images of a scene as would be recorded by a camera from a respective series of positions relative to the scene, the image strips of the respective series representing strips of the respective images displaced from one another by at least two selected displacements;
   B. a mosaic image generator module configured to mosaic the respective series of images strips together thereby to construct two panoramic mosaic images, the panoramic mosaic images comprising the stereoscopic panoramic mosaic image pair providing a stereoscopic image of the scene.

26. A system as defined in claim 25 in which the strip generator module includes
   A. a camera configured to record a plurality of images; and
   B. a strip selector module configured to select at least two image strips from respective ones of the images, one of the selected image strips from each of the images being associated with one of the respective series, the strip selector module being configured to control the locations in the respective images from which the image strips are selected thereby to provide the respective displacements.

27. A system as defined in claim 25 in which the strip generator module is configured to generate at least some of said image strips using a selected computer graphics methodology.

28. A system as defined in claim 25 in which:

A. the strip generator module is further configured to generate a third series of image strips, all of said image strips in said third series comprising strips of a series of images of a scene as would be recorded by a camera, the image strips of the third series being displaced from the image strips of the other two series by another selected displacement; and B. the mosaic image generator module is further configured to mosaic the third series of images strips together thereby to construct a third panoramic mosaic image, a selected two of the panoramic mosaic images comprising the stereoscopic panoramic mosaic image pair.

29. A system for displaying a stereo panoramic image to a viewer, said system comprising:

A. a panoramic screen;

B. a plurality of projectors each disposed to project a respective portion of one of a plurality panoramic images in overlapping fashion on the screen, each panoramic image being for viewing by a respective one of a viewer's eyes; and C. a viewing arrangement for facilitating transmission of a respective one of said images to each of the viewer's eyes thereby to facilitate stereoscopic viewing of the panoramic image defined by the panoramic images.

30. A system as defined in claim 29 in which:

A. the respective panoramic images are polarized with orthogonal polarizations; and B. the viewing arrangement comprises a pair of lenses polarized with corresponding orthogonal polarizations.

31. A system as defined in claim 29 in which:

A. the respective panoramic images are of different colors; and

B. the viewing arrangement comprises a pair of lenses having the corresponding colors.

32. A system for displaying a stereo panoramic image to a viewer, said system comprising:

A. a panoramic screen;

B. a plurality of projectors each configured to project a respective portion of a panoramic image on the screen, the panoramic image comprising alternating portions of panoramic images each to be alternatingly viewed by respective ones of a viewers eyes; and C. a viewing arrangement for facilitating alternating transmission of the respective alternating portions to respective ones of the viewer's eyes thereby to facilitate stereoscopic viewing of the panoramic image.

33. A system as defined in claim 32 in which the viewing arrangement comprises a pair of lenses, each lens being associated with a shutter, the shutters being configured to alternatingly open and close in synchrony with the display of the respective alternating portions.

34. A method of generating a stereoscopic panoramic mosaic image pair comprising the steps of:

A. a strip generation step of generating two series of image strips, all of said image strips in each series comprising strips of a series of images of a scene as would be recorded by a camera from a respective series of positions relative to the scene, the image strips of the respective series representing strips of the respective images displaced from one another by at least one selected displacement; and B. a mosaic image generation step of mosaicing the respective series of images strips together thereby to construct two panoramic mosaic images, the panoramic mosaic images comprising the stereoscopic panoramic mosaic image pair providing a stereoscopic image of the scene as recorded over the path.

35. A method as defined in claim 34 in which the series of positions define a path at least a portion of which corresponds to a circular arc.

36. A method as defined in claim 34 in which the series of positions define a path at least a portion of which corresponds to a straight line.

37. A method as defined in claim 34 in which the series of positions define a translation relative to the scene.

38. A method as defined in claim 34 in which the series of positions define a change in angular orientation relative to the scene.

39. A method as defined in claim 34 in which the image strips are parallel to an axis defined for the respective image.

40. A method as defined in claim 39 in which the axis is horizontal.

41. A system as defined in claim 39 in which the axis is vertical.

42. A method as defined in claim 34 in which the strip generation step includes the step of using a camera configured to record at least one image strip.

43. A method as defined in claim 42 in which the strip generation step includes the step of using a camera configured to record a plurality of image strips from both series.

44. A method as defined in claim 43 in which the strip generation step includes the step of using a plurality of cameras configured to record at least image strips from both series, the plurality of cameras being disposed at respective positions along the path.

45. A method as defined in claim 42 in which the strip generation step further includes the steps of A. using a reflector configured to reflect images of the scene to the camera for recording thereby; and B. positioning the reflector at least one position to facilitate definition of the path.

46. A method as defined in claim 45 in which the reflector has at least one flat portion.

47. A method as defined in claim 45 in which the reflector has at least one flat portion.

48. A method as defined in claim 45 in which the reflector positioning step includes the step of positioning the reflector at a plurality of positions to facilitate definition of the path.

49. A method as defined in claim 34 in which the strip generation step includes the step of generating at least one image strip using a selected computer graphics methodology.

50. A method as defined in claim 49 in which the strip generation step includes the step of generating a plurality of image strips; at least one of the plurality of image strips being generated using the selected computer graphics methodology.

51. A method as defined in claim 49 in which the strip generation step includes the step of generating the two series of image strips such that the displacement varies as between at least two images.

52. A method as defined in claim 51 in which the strip generation step includes the steps of A. using a camera to record a plurality of images; and B. a strip selection step of selecting at least two image strips from respective ones of the images, one of the selected image strips from each of the images being associated with one of the respective series, the strip selection step including the step of controlling the locations in the respective images from which the image strips are selected thereby to provide the respective displacements.

53. A method as defined in claim 52 in which the strip selection step includes the step of controlling the locations in the respective images from which the image strips are selected by controlling the separations of the image strips in the respective images.

54. A method as defined in claim 51 in which the strip generation step includes the step of generating at least some of said image strips using a selected computer graphics methodology.

55. A method as defined in claim 34 in which:
   A. the strip generation step includes the step of generating a third series of image strips, all of said image strips in said third series comprising strips of a series of images of a scene as would be recorded by a camera, the image strips of the third series being displaced from the image strips of the other two series by another selected displacement; and
   B. the mosaic image generation step includes the step of mosaicing the third series of images strips together thereby to construct a third panoramic mosaic image, a selected two of the panoramic mosaic images comprising the stereoscopic panoramic mosaic image pair.

56. A method as defined in claim 34 in which:
   A. the strip generation step includes the step of generating camera position information representing positions of the camera associated with the respective image strips; and
   B. the mosaic image generation step includes the step of using the camera position information in constructing the panoramic mosaic images.

57. A method as defined in claim 34 in which the mosaic image generation step includes the step of generate at least one of the panoramic mosaic images by measuring image motion between successive image strips using a selected computer vision technique.

58. A method for generating a stereoscopic panoramic mosaic image pair comprising:
   A. a strip generation step of generating two series of image strips, all of said image strips in each series comprising strips of a series of images of a scene as would be recorded by a camera from a respective series of positions relative to the scene, the image strips of the respective series representing strips of the respective images displaced from one another by at least two selected displacements; and
   B. a mosaic image generation step of mosaicing the respective series of images strips together thereby to construct two panoramic mosaic images, the panoramic mosaic images comprising the stereoscopic panoramic mosaic image pair providing a stereoscopic image of the scene.

59. A method as defined in claim 38 in which the strip generation step includes the steps of
   A. using a camera to record a plurality of images; and
   B. a strip selection step of selecting at least two image strips from respective ones of the images, one of the selected image strips from each of the images being associated with one of the respective series, the strip selection step including the step of controlling the locations in the respective images from which the image strips are selected thereby to provide the respective displacements.

60. A method as defined in claim 59 in which the strip selection step includes the step of controlling the locations in the respective images from which the image strips are selected by controlling the separations of the image strips in the respective images.

61. A method as defined in claim 38 in which the strip generation step includes the step of generating at least some of said image strips using a selected computer graphics methodology.

62. A method as defined in claim 38 in which:
   A. the strip generation step includes the step of generating a third series of image strips, a third series of image strips, all of said image strips in said third series comprising strips of a series of images of a scene as would be recorded by a camera, the image strips of the third series being displaced from the image strips of the other two series by another selected displacement; and
   B. the mosaic image generation step includes step of mosaicing the third series of images strips together thereby to construct a third panoramic mosaic image, a selected two of the panoramic mosaic images comprising the stereoscopic panoramic mosaic image pair.

63. A method as defined in claim 58 in which:
   A. the strip generation step includes the step of generating camera position information representing positions of the camera associated with the respective image strips; and
   B. the mosaic image generation step includes the step of using the camera position information in constructing the panoramic mosaic images.

64. A method as defined in claim 58 in which the mosaic image generation step includes the step of generate at least one of the panoramic mosaic images by measuring image motion between successive image strips using a selected computer vision technique.

65. A method of displaying a stereo panoramic image to a viewer on a panoramic screen, said method comprising the steps of:
   A. using a plurality of projectors each disposed to project a respective portion of one of a plurality panoramic images in overlapping fashion on the screen; and
   C. using a viewing arrangement to facilitate transmission of a respective one of said images to each of the viewer's eyes thereby to facilitate stereoscopic viewing of the panoramic image defined by the respective panoramic images.

66. A method as defined in claim 65 in which:
   A. the respective panoramic images are polarized with orthogonal polarizations; and
   B. the viewing arrangement using step includes the step of using a viewing arrangement that comprises a pair of lenses polarized with corresponding orthogonal polarizations.

67. A method as defined in claim 65 in which:
   A. the respective panoramic images are of different colors; and
   B. the viewing arrangement using step includes the step of using a viewing arrangement that comprises a pair of lenses having the corresponding colors.

68. A method displaying a stereo panoramic image to a viewer on a panoramic screen, said method comprising the steps of:
   A. using a plurality of projectors each configured to project a respective portion of a panoramic image on the screen, the panoramic image comprising alternating portions of panoramic images each to be alternatingly viewed by respective ones of a viewers eyes; and
   C. using a viewing arrangement for facilitating alternating transmission of the respective alternating portions to respective ones of the viewer's eyes thereby to facilitate stereoscopic viewing of the panoramic image.

69. A method as defined in claim 68 in which the viewing arrangement comprises a pair of lenses, each lens being associated with a shutter, the method including the step of controlling the shutters to alternatingly open and close in synchrony with the display of the respective alternating portions.

70. A computer program product for use in connection with a computer to provide a system for generating a stereoscopic panoramic mosaic image pair, the computer program product comprising a computer-readable medium having encoded thereon:
 A. a strip generator module configured to enable the computer to generate two series of image strips, all of said image strips in each series comprising strips of a series of images of a scene as would be recorded by a camera from a respective series of positions relative to the scene, the image strips of the respective series representing strips of the respective images displaced from one another by at least one selected displacement; and
 B. a mosaic image generator module configured to enable the computer to mosaic the respective series of images strips together thereby to construct two panoramic mosaic images, the panoramic mosaic images comprising the stereoscopic panoramic mosaic image pair providing a stereoscopic image of the scene as recorded over the path.

71. A computer program product as defined in claim 70 in which the series of positions define a path at least a portion of which corresponds to a circular arc.

72. A computer program product as defined in claim 70 in which the series of positions define a path at least a portion of which corresponds to a straight line.

73. A computer program product as defined in claim 70 in which the series of positions define a translation relative to the scene.

74. A computer program product as defined in claim 70 in which the series of positions define a change in angular orientation relative to the scene.

75. A computer program product as defined in claim 70 in which the image strips are parallel to an axis defined for the respective image.

76. A computer program product as defined in claim 75 in which the axis is horizontal.

77. A computer program product as defined in claim 75 in which the axis is vertical.

78. A computer program product as defined in claim 70, the system further including a camera configured to record an image including at least one image strip, the strip generator module being further configured to enable the computer to generate the at least one image strip from the image.

79. A computer program product as defined in claim 78 in which the camera is configured to record a plurality of images each including at least one image strip from both series, the strip generator module being further configured to enable the computer to generate the respective image strops from the respective images.

80. A computer program product as defined in claim 79 in which system includes a plurality of cameras configured to record at least image strips from both series, the plurality of cameras being disposed at respective positions along the path.

81. A computer program product as defined in claim 78 in which
 A. the system further includes a reflector configured to reflect images of the scene to the camera for recording thereby; and
 B. the strip generator module further includes a reflector position control module configured to enable the computer to enable the reflector to be positioned at at least one position to facilitate definition of the path.

82. A computer program product as defined in claim 81 in which the reflector has at least one flat portion.

83. A computer program product as defined in claim 81 in which the reflector has at least one flat portion.

84. A computer program product as defined in claim 81 in which the reflector position control module is configured to enable the computer to enable the reflector to be positioned at a plurality of positions to facilitate definition of the path.

85. A computer program product as defined in claim 70 in which the strip generator module is configured to enable the computer to generate at least one image strip using a selected computer graphics methodology.

86. A computer program product as defined in claim 85 in which the strip generator module is configured to enable the computer to generate a plurality of image strips, at least one of the plurality of image strips being generated using the selected computer graphics methodology.

87. A computer program product as defined in claim 70 in which the strip generator module is configured to enable the computer to generate generate the two series of image strips such that the displacement varies as between at least two images.

88. A computer program product as defined in claim 87 in which:
 A. the system includes a camera configured to record a plurality of images; and
 B. the strip generator module includes a strip selector module configured to enable the computer to select at least two image strips from respective ones of the images, one of the selected image strips from each of the images being associated with one of the respective series, the strip selector module being configured to enable the computer to control the locations in the respective images from which the image strips are selected thereby to provide the respective displacements.

89. A computer program product as defined in claim 88 in which the strip selector module is configured to enable the computer to control the locations in the respective images from which the image strips are selected by controlling the separations of the image strips in the respective images.

90. A computer program product as defined in claim 87 in which the strip generator module is configured to enable the computer to generate at least some of said image strips using a selected computer graphics methodology.

91. A computer program product as defined in claim 70 in which:
 A. the strip generator module is further configured to enable the computer to generate a third series of image strips, all of said image strips in said third series comprising strips of a series of images of a scene as would be recorded by a camera, the image strips of the third series being displaced from the image strips of the other two series by another selected displacement; and
 B. the mosaic image generator module is further configured to enable the computer to mosaic the third series of images strips together thereby to construct a third panoramic mosaic image, a selected two of the panoramic mosaic images comprising the stereoscopic panoramic mosaic image pair.

92. A computer program product as defined in claim 70 in which:
 A. the strip generator module is further configured to enable the computer to generate camera position information representing positions of the camera associated with the respective image strips; and B. the mosaic image generator module is further configured to enable the computer to use the camera position information in constructing the panoramic mosaic images.

93. A computer program product as defined in claim 70 in which the mosaic image generator module is configured to enable the computer to generate at least one of the panoramic mosaic images by measuring image motion between successive image strips using a selected computer vision technique.

94. A computer program product for use in connection with a computer to provide a system for generating a stereoscopic panoramic mosaic image pair, the computer program product comprising a computer readable medium having encoded thereon:

A. a strip generator module configured to enable the computer to generate two series of image strips, all of said image strips in each series comprising strips of a series of images of a scene as would be recorded by a camera from a respective series of positions relative to the scene, the image strips of the respective series representing strips of the respective images displaced from one another by at least two selected displacements;

B. a mosaic image generator module configured to enable the computer to mosaic the respective series of images strips together thereby to construct two panoramic mosaic images, the panoramic mosaic images comprising the stereoscopic panoramic mosaic image pair providing a stereoscopic image of the scene.

95. A computer program product as defined in claim 94 in which

A. the system includes a camera configured to record a plurality of images; and

B. the strip generator module includes a strip selector module configured to enable the computer to select at least two image strips from respective ones of the images, one of the selected image strips from each of the images being associated with one of the respective series, the strip selector module being configured to control the locations in the respective images from which the image strips are selected thereby to provide the respective sets of angles.

96. A computer program product as defined in claim 95 in which the strip selector module is configured to enable the computer to control the locations in the respective images from which the image strips are selected by controlling the separations of the image strips in the respective images.

97. A computer program product as defined in claim 94 in which the strip generator module is configured to enable the computer to generate at least some of said image strips using a selected computer graphics methodology.

98. A computer program product as defined in claim 94 in which:

A. the strip generator module is further configured to enable the computer to generate a third series of image strips, all of said image strips in said third series comprising strips of a series of images of a scene as would be recorded by a camera, the image strips of the third series being displaced from the image strips of the other two series by another selected displacement; and B. the mosaic image generator module is further configured to enable the computer to mosaic the third series of images strips together thereby to construct a third panoramic mosaic image, a selected two of the panoramic mosaic images comprising the stereoscopic panoramic mosaic image pair.

99. A computer program product as defined in claim 94 in which:

A. the strip generator module is further configured to enable the computer to generate camera position information representing positions of the camera associated with the respective image strips; and B. the mosaic image generator module is further configured to enable the computer to use the camera position information in constructing the panoramic mosaic images.

100. A computer program product as defined in claim 94 in which the mosaic image generator module is configured to enable the computer to generate at least one of the panoramic mosaic images by measuring image motion between successive image strips using a selected computer vision technique.

* * * * *

UNITED STATES PATENT AND TRADEMARK OFFICE
CERTIFICATE OF CORRECTION

PATENT NO. : 6,665,003 B1
DATED : December 16, 2003
INVENTOR(S) : Shmuel Peleg et al.

It is certified that error appears in the above-identified patent and that said Letters Patent is hereby corrected as shown below:

<u>Title page,</u>
Item [73], Assignee, change "Issum" to -- Yissum --.

Signed and Sealed this

Twenty-fourth Day of August, 2004

JON W. DUDAS
*Director of the United States Patent and Trademark Office*